3,256,305
PROCESS FOR THE PREPARATION OF HALO-ALI-
PHATIC ESTERS OF CARBOXYLIC ACIDS
Jacob van Gijzen, Vlaardingen, Netherlands, assignor to
Fabriek van Chemische Producten Vondelingenplaat
N.V., Rotterdam, Netherlands, a corporation of Dutch
law
No Drawing. Filed Nov. 13, 1962, Ser. No. 237,342
Claims priority, application Netherlands, Nov. 16, 1961,
271,471
7 Claims. (Cl. 260—408)

The invention relates to a process for the preparation of halo-alkyl esters of carboxylic acids by conversion of carboxylic halides having the general formula

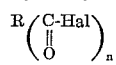

in which R stands for a substituted or non-substituted aliphatic, cyclo-aliphatic, aromatic, or heterocyclic radical, which may or may not be saturated, Hal is a halogen atom preferably a chorine atom or a bromide atom, and $n$ represents an integer varying from 1 to 4. These esters can be prepared in the conventional way by reacting a carboxylic acid or a carboxylic anhydride with a halogen alcohol, by reacting a carboxylic halide with a halogen alcohol, or by reacting a carboxylic halide with a cyclic ether.

Now it was found that a halo-alkyl ester of a carboxylic acid can be prepared in a simple way by reacting a carboxylic halide with a cyclic ester of an aliphatic bivalent or polyvalent alcohol, a bivalent inorganic volatile acid, according to the reaction equation:

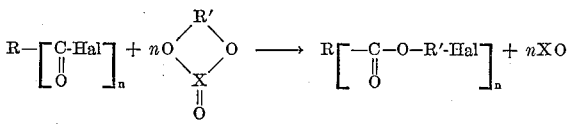

In this equation R, Hal, and $n$ have the meaning mentioned above, while R' represents a substituted or non-substituted alkylene or cyclo-alkylene radical having not more than 8 carbon atoms and X stands for a sulphur or a carbon atom.

Suitable carboxylic halides are the halides of acetic acid, stearic acid, monochloroacetic acid, methoxypropionic acid, methacrylic acid, linolenic acid, succinic acid, benzoic acid, isophthalic acid, cyclohexanecarboxylic acid, propiolic acid, phenylacetic acid, cinnamic acid, nicotinic acid, 4-nitro-benzoic acid, sebacic acid, and pyromucic acid.

Suitable cyclic esters are ethylene carbonate, propylene sulphite, and tetramethylene sulphite.

The uses of the products of this reaction are well-known; they have been employed as plasticizers in plastics and as intermediates for further syntheses. A number of the compounds according to the invention have not yet been specifically described in the literature.

From Industrie Chimique Belge 20 (1955), special issue, 656–7, it is known that at elevated temperatures, under the influence of catalysts, cyclic esters may be reacted into the corresponding epoxyalkanes.

Furthermore the reaction between a cyclic ether and an acid halide is known from British patent Specification 842,071, German patent Specification 1,081,450, and Journal of the American Chemical Society 55 (1933), 374.

It has been found that the reaction according to the invention can be carried out at temperatures above as well as below 180° C. From this, it appears that in the process according to the invention cyclic esters are not first converted into the corresponding cyclic ethers and are reacted only then with a carboxylic halide; instead, it appears that a direct reaction of the initial substances takes place. Moreover it appears from the following experiment that the formation of cyclic ethers under the same reaction conditions as in the preparation of esters is insignificant.

Ethylene carbonate (1 mol) is heated with stirring to 145–150° C. together with 1 g. of lithium bromide. The course of the decomposition is shown in column A. Under the same conditions the same experiment is carried out, adding 1 mol of benzoyl chloride. The course of the reaction and formation of β-chloroethyl benzoate is mentioned in column B.

| Time in hours | A in percent | B in percent |
|---|---|---|
| 1 | 0.6 | 21 |
| 2 | 1.2 | 36 |
| 3 | 1.9 | 50 |
| 4 | 2.5 | 60 |

In Comptes rendus Academie sciences Paris 190 (1930) 56, among others, a reaction between diethyl sulphite and benzoyl chloride is described. In this case, however, a non-cyclic ester is used and moreover no halo-alkyl ester is formed.

Over the conventional esterification methods for the halo-alkyl esters of carboxylic acids the process according to the invention has the following practical advantages:

(1) Excess alcohol is not required, since equimolar quantities can be used;

(2) Water is not formed during the reaction; hence, there is no need for a drying step and there is no danger of a saponifying effect upon the halogen alcohol;

(3) The use of halogen alcohols, several of which are highly poisonous, is avoided; and (4) Corrosive catalysts need not be used.

The present process has a practical advantage over the process in which a cyclic ether is reacted with an acid halide; the use of poisonous cyclic ethers can be omitted. In addition the process according to the invention is advantageous in those cases in which the cyclic ether may be obtained with difficulty or can only be prepared via the cyclic ester, as in the case of trimethylene oxide, for instance.

Without a catalyst, the reaction, if any, between an acid halide and a cyclic ester usually proceeds extremely slowly. Under the influence of a catalyst, including acids, salts, and bases, the reaction is considerably accelerated, even at temperatures below 100° C. Examples of acid catalysts are sulphuric acid, hydrochloric acid, toluene-sulphonic acid, potassium bisulphate, zinc chloride, aluminum chloride, magnesium chloride. Basic compounds, such as pyridine and alkali hydroxide, also accelerate the reaction. Among the salts, special mention may be made of the halides of the alkali metals and the ammonium halides.

The process according to the invention can be carried out in a simple reaction vessel, equipped with a controllable heating device, a stirrer, and a reflux condenser. The acid halide and the cyclic ester are generally used in equivalent quantities. Dependent on the nature of the components, the catalyst, and other factors, the reaction mixture is heated to that temperature at which a vivid evolution of gas occurs. The duration of the reaction can be controlled as desired, for instance by means of the temperature or the quantity of catalyst. The quantity of catalyst to be used is up to 5 percent by weight, referred to the initial components.

When the reaction is complete, the halo-alkyl esters can be purified by distillation and crystallization or via simple purification methods, like washing and clarifying. The course of the reaction can be verified, for instance, by checking the quantity of escaping carbon dioxide or sulphur dioxide and by determining the refractive index or the melting point. If desired, the reaction can be carried out in an inert solvent or diluent.

Example I 141 g. of benzoyl chloride (1 mol) and 89 g. of ethylene carbonate (1.01 mols) are heated to 160° C. in a reaction flask equipped with a stirrer, a thermometer, and a reflux condenser. 2 g. of lithium chloride is used as catalyst. When the vivid evolution of carbon dioxide begins to decrease, the temperature is raised to 180° C. After 2 to 3 hours the theoretical quantity of carbon dioxide has escaped. The reaction product is a perfectly clear, almost colorless liquid ($n_D^{23}=1.5263$).

The insoluble catalyst is removed by filtration.

Upon distillation under reduced pressure, 177 g., i.e., 95% of the theory, of pure (β-chloroethyl) benzoate is obtained. Boiling point 91–93°/0.5 mm., $n_D^{23}=1.5257$.

Example II 102 g. of caproyl chloride (0.75 mol), 93 g. of trimethylene sulphite (0.76 mol), and 20 mg. of anhydrous zinc bromide react violently at 90° C., forming sulphur dioxide. In 1¼ hours the reaction is complete, a clear brown-colored liquid being obtained ($n_D^{21}=1.4413$). At distillation under reduced pressure colorless (δ-chloropropyl) capronate is obtained from this. Yield 96% of the theory. Boiling point 82–84° C./2 mm. mercury pressure, $n_D^{21}=1.4388$. This compound has not been described previously in the literature. Formula:

$$C_9H_{17}ClO_2$$

Chlorine content: calculated 18.41%; found 18.43%.

In the table below the reaction conditions, the yield, and the most important physical constants of a number of esters prepared according to the process of the invention are mentioned. The listed conversion temperature is the temperature at which the reaction proceeds spontaneously. In many cases, as also mentioned in Example I, at the end the temperature is raised by 20–30° C., so as to complete the last stage of the conversion rapidly.

Wherever a yield is given, this relates to the product obtained by distillation or crystallization. If no yield is given, the conversion product has not been purified and the physical constants hold for the crude conversion product.

In the experiments marked with an asterisk mixtures of the two possible isomers are formed.

| No. | Acid halide | Cyclic ester | T., ° C. | Catalyst | Time in hours | Yield in percent | Physical constants |
|---|---|---|---|---|---|---|---|
| 3 | Palmitoylchloride | Ethylenecarbonate | 160 | LiBr | 3 | 97 | M.P. 39.5–40.5° C. |
| 4 | P-nitro-benzoyl chloride. | ----do---- | 180 | KF | 4 | | M.P. 52–54° C. |
| 5 | Benzoyl chloride | Propylene carbonate | 125 | LiBr | 4 | | $d_4^{20}=1.1693$. $n_D^{20}=1.5179$. |
| 6 | Cinnamoyl chloride | Ethylene carbonate | 150 | LiI | 5 | 94 | M.P. 31.5–32° C. B.P. 185–186°/19 mm. $n_D^{20}=1.5265$. |
| 7 | Benzoyl chloride | Ethylene sulphite | 125 | BF₃Et₂O | 2 | 91 | |
| 8 | Sebacyl chloride | Ethylene carbonate | 140 | Me₄NBr | 2 | 91 | M.P. 51–52° C. |
| 9 | Caproyl chloride | Ethylene sulphite | 50 | Zinc acetate | 1 | 97 | New compound. B.P. 137–138°/82 mm. $n_D^{21}=1.4362$. |
| 10 | p-Chlorobenzoyl chloride. | ----do---- | 150 | LiCl | 12 | 98 | New Compound. M.P. 38–40° C. B.P. 117–118°/2 mm. |
| 11* | Acetyl chloride | 1.3-butylene sulphite | 60 | ZnCl₂ | 2 | 91 | $n_D^{20}=1.4289$. $d_4^{20}=1.0750$. B.P. 75–80°/17 mm. |
| 12 | Chloroacetyl chloride | Tetramethylene sulphite. | 100 | CdCl₂ | 2 | 82 | B.P. 138–140°/22 mm. $n_D^{21}=1.4638$. |
| 13 | Pyromucic chloride | Ethylene carbonate | 150 | LiBr | 4 | 98 | B.P. 95–96°/2 mm. $n_D^{22}=1.5060$. $d_4^{20}=1.2931$. |
| 14 | Terephthaloyl chloride. | Ethylene sulphite | 140 | LiCl | 10 | 95 | New compound. M.P. 92–93.5° C. |
| 15* | Butyryl chloride | Propylene sulphite | 100 | AlCl₃ | 5 | 88 | B.P. 75–95°/18 mm. $n_D^{20}=1.4270$. |
| 16 | Caproyl chloride | Tetramethylene sulphite. | 100 | KBF₄ | 5 | 78 | New compound. B.P. 102–103°/2 mm. $n_D^{21}=1.4423$. |
| 17 | Phenoxyacetyl chloride. | Ethylene sulphite | 120 | Me₄NBr | 1 | 90 | New compound. B.P. 170–171°/13 mm. $n_D^{22}=1.5248$. |
| 18* | Pyromucic chloride | 1.3-butylene sulphite | 135 | MgCl₂ | 4 | 80 | New compound. B.P. 110–115°/2 mm. $n_D^{21}=1.4960$. |
| 19 | Phenylacetyl chloride | Ethylene sulphite | 160 | LiCl | 10 | 89 | New compound. B.P. 152–155°/19 mm. $n_D^{21}=1.5197$. |
| 20* | Benzoyl chloride | Propylene sulphite | 140 | Me₄NBr | 2 | | $n_D^{21}=1.5202$. $d_4^{20}=1.1622$. |
| 21 | Benzoyl bromide | Ethylene sulphite | 80 | LiCl | 3 | 45 | B.P. 162–167°/20 mm. $n_D^{20}=1.5452$. |
| 22 | Acetyl bromide | ----do---- | 65 | ZnCl₂ | 5 | 73 | B.P. 160–163° C. $n_D^{22}=1.4541$. |
| 23 | β(furyl-2) acrylic chloride. | Ethylene carbonate | 130 | Me₄NBr | 5 | 71 | B.P. 133–135°/4 mm. $n_D^{22}=1.5697$. $d_4^{20}=1.2398$. |
| 24 | Benzoyl chloride | Tetramethylene sulphite. | 95 | MgCl₂ | 3 | 83 | B.P. 117–8°/0.2 mm. $n_D^{20}=1.5203$. |
| 25 | Benzophenone p.p'-di-carbonyl chloride. | Ethylene sulphite | 120 | Me₄NBr | 1.5 | 95 | New compound. M.P. 172–174° C. |
| 26 | Acetyl chloride | Pentaerythritol disulphite. | 50 | ZnCl₂ | 4 | 90 | B.P. 182–5°/19 mm. $n_D^{19}=1.4698$. |
| 27 | ----do---- | Trans-1,2-cyclohexylene sulphite. | 75 | ZnBr₂ | 1 | 92 | B.P. 94–98°/10 mm. $n_D^{19}=1.4652$. |
| 28 | Camphoric chloride | Ethylene carbonate | 130 | Me₄NCl | 1.5 | 84 | B.P. 163–168°/0.2 mm. $n_D^{20}=1.4935$. |

What is claimed is:

1. A process for the preparation of a halo-aliphatic ester of a carboxylic acid by conversion of a carboxylic halide having the general formula

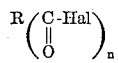

in which R stands for a member selected from the group consisting of aliphatic, cycloaliphatic, aromatic and heterocyclic radicals, Hal is a member selected from the group consisting of chlorine and bromine, and $n$ represents an integer varying from 1 to 4, which comprises contacting said carboxylic halide with a cyclic ester having the formula

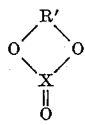

in which R' stands for a member selected from the group consisting of an aliphatic radical and a cycloaliphatic radical having not more than 8 carbon atoms and X stands for a member of the group consisting of a sulphur and a carbon atom.

2. The process of claim 1 wherein the cyclic ester is the ester of a multivalent alcohol and a bivalent inorganic volatile acid.

3. The process of claim 2 wherein the contacting is carried out in the presence of a catalyst selected from the group consisting of sulphuric acid, hydrochloric acid, toluenesulphonic acid, potassium bisulphate, zinc chloride, aluminum chloride, magnesium chloride, pyridine, an alkali hydroxide, an alkali halide and an ammonium halide.

4. The process of claim 3 wherein the carboxylic halide is a benzoyl chloride and the cyclic ester is an alkylene carbonate, the alkylene radical having up to four carbon atoms.

5. The process of claim 4 wherein the carboxylic halide is a benzoyl chloride and the cyclic ester is an alkylene sulphite, the alkylene radical having up to 4 carbon atoms.

6. The process of claim 4 wherein the carboxylic halide is a fatty acid halide and the cyclic ester is an alkylene carbonate, the alkylene radical having up to 4 carbon atoms.

7. The process of claim 4 wherein the carboxylic halide is fatty acid halide and the cyclic ester is an alkylene sulphite, the alkylene radical having up to 4 carbon atoms.

References Cited by the Examiner

UNITED STATES PATENTS 2,448,767   9/1948   Carlson _____ 260—284
2,449,994   9/1948   Gresham et al. _____ 260—408

OTHER REFERENCES

Curme et al.: "Glycols," Reinhold Publishing Corp., New York (1952), p. 95.

Ivin: Zhur Obshchei Khim, 1958, vol. 28, 180–184.

Markley: "Fatty Acid," second edition, part 2, Interscience Publishers, Inc., New York (1961), p. 1150.

CHARLES B. PARKER, *Primary Examiner.*

D. D. HORWITZ, *Examiner.*

ANTON SUTTO, *Assistant Examiner.*